United States Patent
Inoue

(10) Patent No.: US 6,570,829 B1
(45) Date of Patent: May 27, 2003

(54) METHOD OF CONTROLLING OPTICAL DISK APPARATUS

(75) Inventor: Katsuichi Inoue, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/549,170

(22) Filed: Apr. 13, 2000

(30) Foreign Application Priority Data

Apr. 15, 1999 (JP) ............................................. 11-107984

(51) Int. Cl.$^7$ ................................................. G11B 7/00
(52) U.S. Cl. ................................. 369/44.35; 369/44.36; 369/53.2
(58) Field of Search ........................... 369/44.11, 44.14, 369/44.17, 44.26, 44.29, 44.32, 44.33, 44.35, 44.36, 53.23, 53.28, 53.2, 53.22, 53.31

(56) References Cited

U.S. PATENT DOCUMENTS

| | | | |
|---|---|---|---|
| 4,344,165 A | * 8/1982 | Akiyama | 369/44.36 |
| 4,750,161 A | * 6/1988 | Takeuchi et al. | 369/44.11 |
| 5,202,865 A | * 4/1993 | Yanagi | 369/30.1 |
| 5,212,675 A | * 5/1993 | Yoshino et al. | 369/44.36 |
| 5,224,085 A | * 6/1993 | Shinkai et al. | 369/44.33 |
| 5,343,454 A | * 8/1994 | Watanabe et al. | 369/44.32 |
| 5,710,748 A | * 1/1998 | Hofer | 369/44.35 |
| 5,886,963 A | * 3/1999 | Abe et al. | 369/44.35 |
| 5,963,516 A | * 10/1999 | Hashimoto et al. | 369/44.29 |
| 6,298,024 B1 | * 10/2001 | Nomura | 369/53.22 |
| 6,473,373 B1 | * 10/2002 | Soma et al. | 369/44.29 |

FOREIGN PATENT DOCUMENTS

| | | |
|---|---|---|
| JP | 7-153092 | 6/1995 |
| JP | 10-269617 | 10/1998 |

* cited by examiner

*Primary Examiner*—Thang V. Tran
*Assistant Examiner*—Bach Vuong
(74) *Attorney, Agent, or Firm*—Morgan, Lewis & Bockius LLP

(57) ABSTRACT

When a MD is inserted (step S1), AGC is executed for reading the TOC area of the MD 1, and thereafter the information stored in the TOC area of the MD are read to detect the kind and recording capacity, etc. of the MD (step S2, S3). Next, the data relative to the executing position of AGC corresponding to the kind of the detected MD is read out from the memory (step S4). Now, where the MD is of a pre-mastered type, according to the recording capacity, either the first executing position P1 or the second executing position P2 is read as occasion demands. On the other hand, where the MD is of the recordable type, two AGC executing positions of the first executing position R1 in a pit area and the second executing position R2 in a groove area are read out. At each of the executing positions thus read out, the AGC is executed (step S5).

9 Claims, 4 Drawing Sheets

METHOD OF CONTROLLING OPTICAL DISK APPARATUS

BACKGROUND OF THE INVENTION

The present invention relates to a method of controlling an optical disk drive or apparatus which irradiates a track of an optical disk with laser light, detects a tracking error on the basis of the reflected light thus produced and automatically controls the gain of a variable gain amplifier of a tracking servo circuit in order to compensate for the detected tracking error.

Generally, the optical disk apparatus for driving a compact disk (CD) or minidisk (MD) includes four servo mechanisms such a tracking servo, focus servo, etc. Among these servo mechanisms, AGC (AGC: Auto Gain Control) is carried out in the servo mechanisms of the tracking, focus and thread.

The AGC, which is one of automatic control functions in a digital signal processor (DSP), intends to control automatically the gain within a filter of the DSP in order to acquire a suitable gain in the servo loop. This compensates for the tracking error or focus error to allow stable reproduction to be made. The AGC is disclosed in Japanese Patent Publication No. 10-269617A, for example.

Meanwhile, in the case of the MD having a small diameter of the optical disks, the tracking servo is problematic. In order to accurately irradiate the track with a laser beam by a pick up so as to track eccentricity occurring in the manufacturing of a disk or chucking, in the tracking servo, a tracking error which is a discrepancy between the irradiated position of the laser beam and the track is detected and an objective lens is moved by a two-axis actuator to control a beam position so that the tracking error is compensated for. Incidentally, the tracking servo is disclosed in Japanese Patent Publication No. 7-153092A, for example.

The method for acquiring the tracking position information or tracking error includes previously known three-beam technique, DPD technique. Among them, the three-beam technique is most common. In the case of the tracking servo by the three beam technique, as shown in FIGS. 4B to 4D, a laser beam is divided into three spots using a diffractive grating so that two subsidiary beam spots A and B are arranged before and after a main beam spot M for signal read. In this case, it is most preferable that the main beam spot M is just above the track T and both subsidiary beams A and B partially overlap the track whereas the remaining part is located on the mirror face of the disk. On the other hand, the states shown in FIGS. 4B and 4D exhibit those where the tracking error has been generated.

The one of both subsidiary beam spots A and B which is located on the mirror face is reflected and the reflected beam is detected by an optical detector. An output from the optical detector is supplied to a circuit as shown in FIG. 4A. In the state of FIG. 4C, since the same quantity of light is detected from both subsidiary beam spots A and B, the output from the circuit shown in FIG. 4A is zero. On the other hand, in the states of FIGS. 4B and 4D, the diffraction of both subsidiary beams spots A and B due to pits is ill-balanced. As a result, in the state of FIG. 4B, the polarity of the output from the circuit of FIG. 4A is positive whereas in the state of FIG. 4D, the polarity of the output from the circuit of FIG. 4A is negative. Thus, the tracking error signals with both polarities can be obtained. Namely, two items of information on which side of one track the beam spot is deviated to and on its quantity of deviation can be obtained.

As is clear from FIG. 5, the curvature radius of track is different in accordance with the radial position of the disk. Namely, the curvature radius of the track at the inner periphery side of the disk is larger than that at the outer periphery side of the disk. Therefore, even if the subsidiary beam spots A and B are adjusted in a proper condition as shown in FIG. 4C on the side of the inner periphery, on the side of the outer periphery, they are shifted unlike that of FIG. 4C.

Further, in the case of the three-beam technique, the output of the tracking signal is influenced by whether the spot position of the laser beam moves accurately perpendicularly to a track tangent line. Therefore, in a case where the AGC is executed at the track licated inner periphery side of the disk, a change in the adjusted gain value is easily produced.

Thus, the AGC in the method of detecting a tracking error by the three-beam technique has a tendency that a gain difference is generated between the inner periphery and outer periphery and a change in the gain adjustment is large on the side of the inner periphery. Therefore, if the AGC for tracking servo is carried out at a fixed position of the side of the inner periphery on the basis of the same rule, the proper gain to be adjusted by AGC will change. This leads to poor tracking in the range of a low frequency and a dropout of sound, otherwise excessive tracking on a flaw in the range of a high frequency. In the case of the MD inner tracks of which situate inner than the inner tracks of CD and CD-ROM, the above problems would be further enhanced.

Conventionally, in many cases, since the AGC for the tracking servo was carried out at the innermost periphery, there is a problem that the gain adjusted by AGC is likely to deviate largely from its proper value.

SUMMARY OF THE INVENTION

The problem to be solved by the present invention is to minimize the gain difference by the AGC for the tracking servo between the sides of the inner periphery and outer periphery.

In order to solve the above problem, according to the present invention, there is provided a method of automatically controlling a gain of a variable gain amplifier in a tracking servo circuit incorporated in an optical disk apparatus for compensating a tracking error detected based on reflected light from an optical disk, comprising the steps of:

determining a position where the automatic gain control (AGC) is executed as an optimum position where a gain difference between an inner periphery side and an outer periphery side of the optical disk become small; and execute the automatic gain control at the determined optimum position.

In such a configuration, the AGC for the variable gain amplifier of the tracking servo circuit is executed at an optimum position where a gain difference between an inner periphery and an outer periphery of the optical disk is smaller. Therefore, the gain difference is minimum so that trackability for eccentricity of the disk and immunity to flaws can be improved. Further, occurrence of dropout of sound is prevented and stabilized tracking can be realized. Such an effect is remarkable in the MD having a smaller diameter than that of CD.

Preferably, the optimum position is determined as a position where a gain $A_0$ of the variable gain amplifier satisfies the following relationships:

$$A0 = A1 + \frac{A2 - A1}{2}$$

where A1 is a gain obtained by executing the automatic gain control at the innermost track of the optical disk; and A2 is a gain obtained by executing the automatic gain control at the outermost track of the optical disk.

Accordingly, the gain difference between the sides of the inner periphery and outer periphery is minimized.

Preferably, information regarding the optimum position is previously stored in a storage unit. The automatic gain control at the optimum position is executed by reading out the optimum position information from the storage unit.

Accordingly, the AGC for the variable gain amplifier of the tracking servo circuit is executed at the executing position read from the storage unit and hence is executed at a fixed position so that stable tracking can be realized.

Preferably, the optimum position includes a first optimum position where is other than the innermost track and a second optimum position located outer than the first optimum position on the optical disk.

In this configuration, the AGC is not executed at the innermost track providing a largest change in the result of the AGC, but is executed at the other position than the innermost track. Therefore, the change in the result of the AGC can be suppressed to realize a stable tracking.

Preferably, information regarding the optimum position is previously stored in a storage unit. The automatic gain control at the optimum position is executed by reading out the optimum position information from the storage unit.

Preferably, the method further comprising the steps of:
detecting a type of the optical disk; and
reading out the optimum position information in accordance with the detected type of the optical disk.

In this configuration, since the executing position previously introduced according to a kind of the optical disk id stored in a storage unit, the AGC for the tracking servo is executed at an optimum position suited to the optical disk at issue so that stable tracking can be realized.

Preferably, when the detected type of the optical disk is a non-recordable disk, the first optimum position is determined as a position where a gain A01 of the variable gain amplifier satisfies the following relationships:

$$A01 = A1 + \frac{A3 - A1}{2}$$

where A3 is a gain obtained by executing the automatic gain control at a predetermined reference position on the optical disk; and
wherein the second optimum position is determined as a position where a gain A02 of the variable gain amplifier satisfies the following relationships:

$$A02 = A3 + \frac{A2 - A3}{2}$$

In this configuration, for the optical disk is a not-recordable disk dedicated to reproduction, the AGC is executed at optimum positions on the sides of the inner periphery and outer periphery at a boundary of the predetermined reference position, and hence stable tracking can be realized.

Preferably, when the detected type of the optical disk is a recordable disk, the first optimum position is determined as a position where a gain A01 of the variable gain amplifier satisfies the following relationships:

$$A01 = A4 + \frac{A5 - A4}{2}$$

where A4 is a gain obtained by executing the automatic gain control at the innermost track of a pit area on the optical disk; and A5 is a gain obtained by executing the automatic gain control at the outermost track of the pit area; and
wherein the second optimum position is determined as a position where a gain A02 of the variable gain amplifier satisfies the following relationships:

$$A02 = A6 + \frac{A7 - A6}{2}$$

where A6 is a gain obtained by executing the automatic gain control at the innermost track of a groove area on the optical disk; and A7 is a gain obtained by executing the automatic gain control at the outermost track of the groove area.

In this configuration, for the recordable optical disk dedicated to recording, the AGC is executed at optimum positions within the pit area and groove area and hence stable tracking can be realized.

Preferably, the optical disk is a minidisk.

In this configuration, in the case of a minidisk (MD) having a smaller diameter than CD, since the executing position previously introduced according to a kind of the MD such as a pre-mastered type and recordable type is stored in a storage unit, the AGC for the tracking servo is executed at an optimum position suited to the MD at issue so that stable tracking can be realized and dropout of sound can be prevented.

DETAILED DESCRIPTION OF THE PREFERRED EMBODIMENTS

Figure 1:
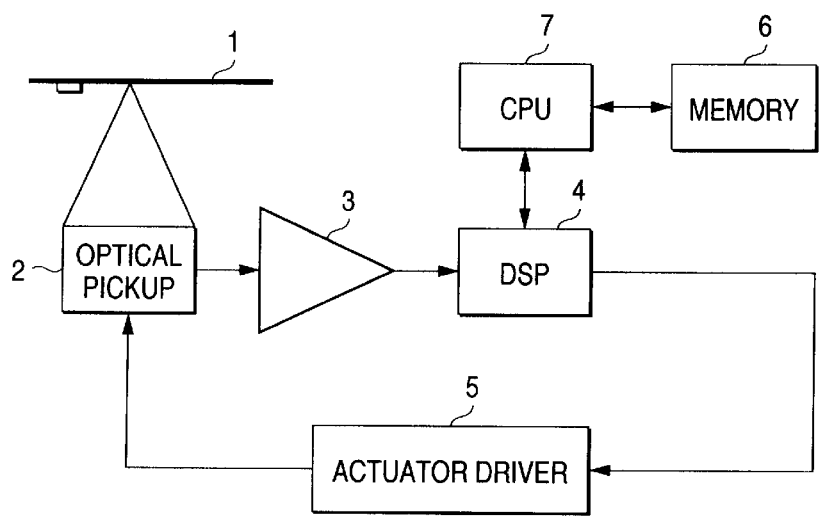
FIG. 1 is a block diagram showing the configuration of an optical disk apparatus according to an embodiment of the invention.
Figure 2A:
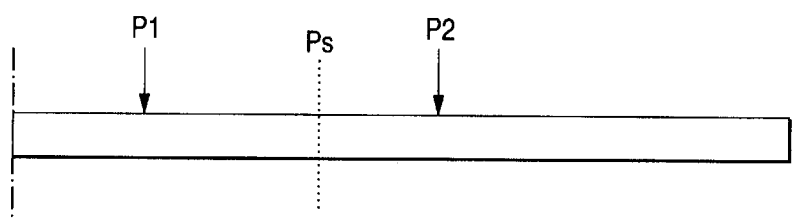
FIGS. 2A and 2B are schematic diagrams showing operations of the optical disk apparatus of FIG. 1.
Figure 2B:
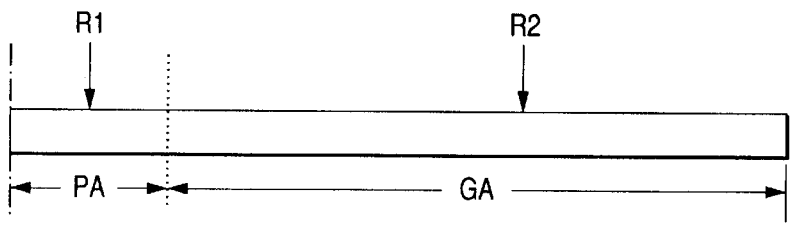
Figure 3:
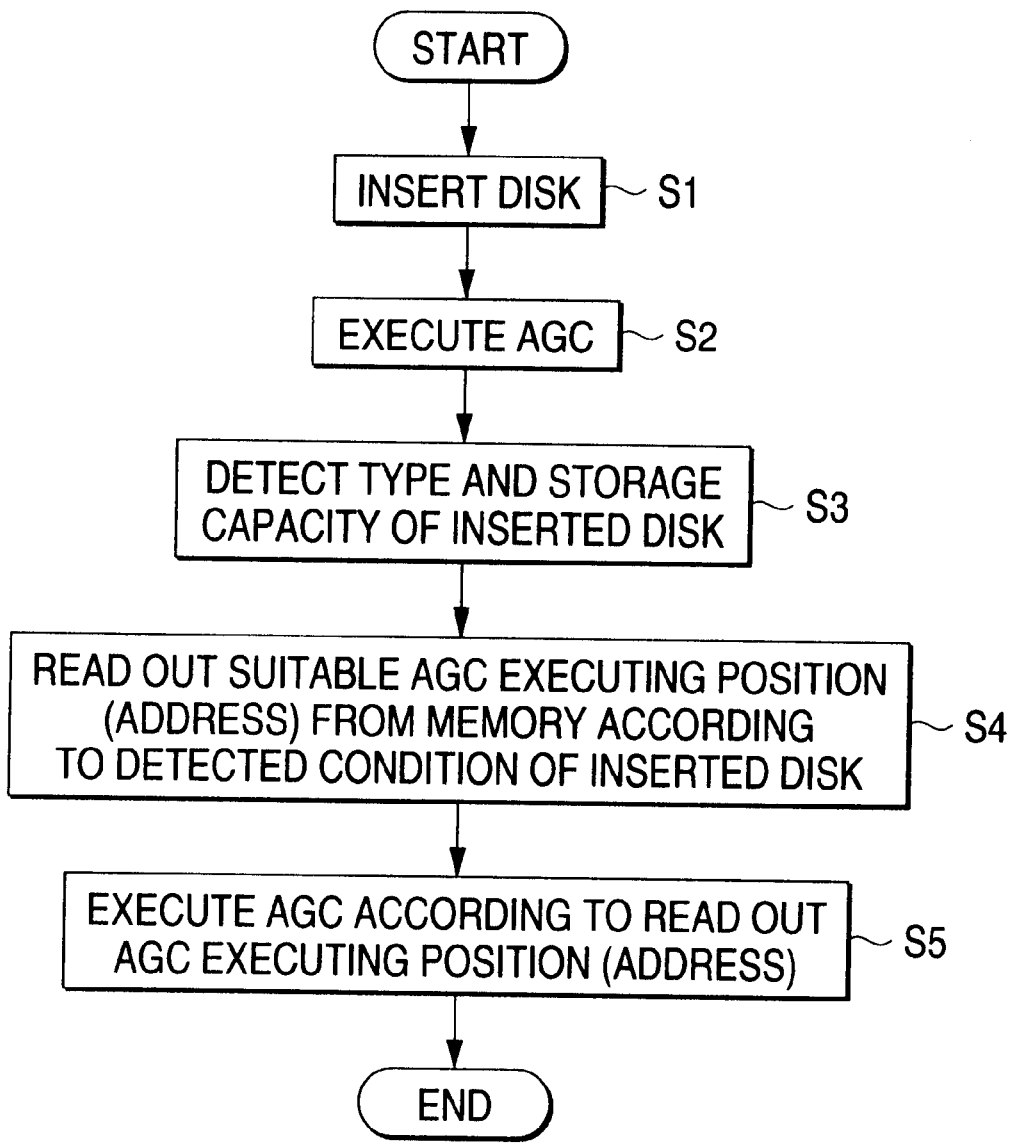
FIG. 3 is a flowchart showing the operation of the optical disk apparatus of FIG. 1.
Figure 4A:
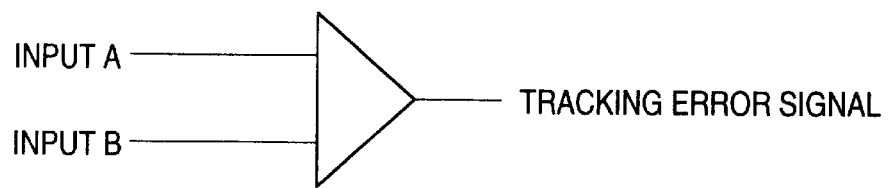
FIGS. 4A to 4D are diagrams for explaining the three-beam method.
Figure 4B:
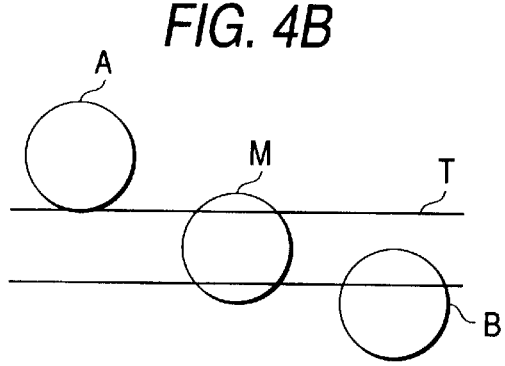
Figure 4C:
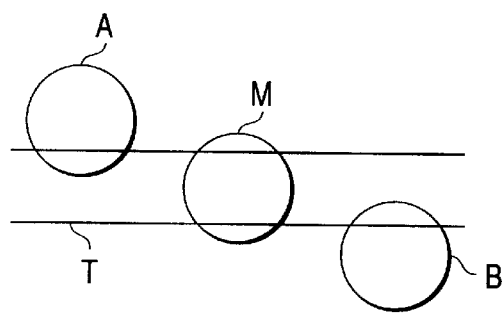
Figure 4D:
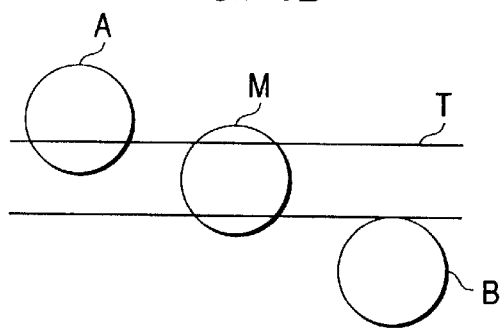
Figure 5:
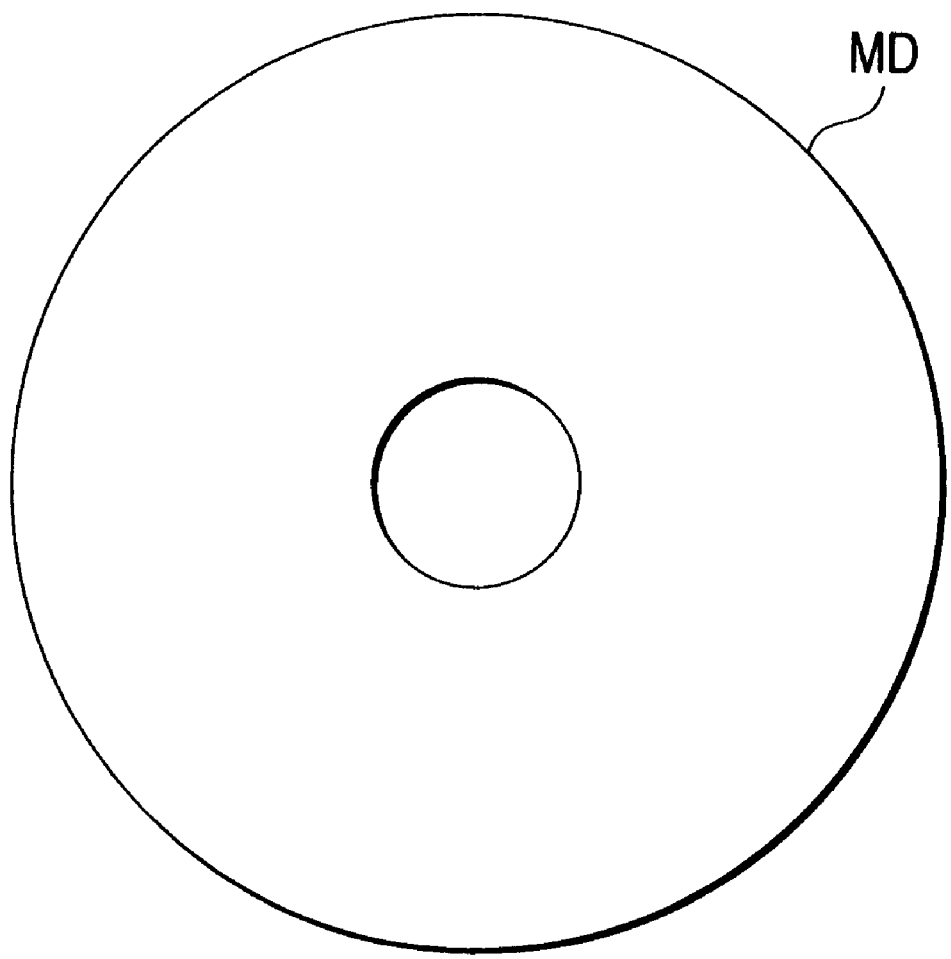
FIG. 5 is a plan view showing a minidisk.

Now referring to FIGS. 1 to 3, an explanation will be given of an embodiment in the case where the invention is applied to an MD (minidisk) apparatus. FIG. 1 is a block diagram showing the configuration of an optical disk apparatus according to an embodiment of the invention. FIGS. 2A and 2B are schematic diagrams showing operations of the optical disk apparatus of FIG. 1. FIG. 3 is a flowchart showing the operation of the optical disk apparatus of FIG. 1.

In FIG. 1, reference numeral 1 denotes a MD. Reference numeral 2 an optical pick-up for focusing a laser beam and irradiating the MD 1 with the focused laser beam. Reference numeral 3 an RF amplifier which receives a light reception signal which is produced according to the amount of light reflected from the MD 1, which is received by the light detector of the optical pick-up 2, and creates a tracking error signal on the basis of the light reception signal. Reference numeral 4 denotes a digital signal processor (DSP) which receives the tracking error signal from the RF amplifier and supplies a signal for driving a tracking actuator for compensating for the error of the tracking error signal to an actuator driver 5. The actuator driver 5 drives the tracking actuator.

Reference numeral 6 denotes a memory such an ROM which is a storage unit in which executing positions introduced according to the kinds of MD such as a pre-mastered type, a recordable type, etc. are stored. Reference numeral 7 denotes a CPU which controls not only the entire apparatus, but also decodes/detects the information such as the kind of the MD and a data storing region on the basis of the disk information read from the MD 1, reads the executing position (address) according the kind of the MD 1 from the memory 6 and makes the AGC for a variable gain amplifier of DSP 4 at the read executing position (address).

Meanwhile, the memory 6 stores the executing position (address) according to the kind of the MD 1, for example on an executing position table. Specifically, in the case of the pre-mastered type dedicated to reproduction, as shown in FIG. 2A, the memory stores a first executing position (address) P1 and a second executing position (address) P2. The first executing position P1 is a position where the difference (XdB) between the gain when the AGC is executed on the innermost periphery and that when the AGC is executed at a prescribed address position Ps (e.g. address 017Ah) is 1/2. The second executing position P2 is a position where the difference (YdB) between the gain when the AGC is executed in the innermost periphery and that when the AGC is executed in the outermost periphery is 1/2.

In this case, in the pre-mastered type of MD1, data are not necessarily recorded on all the tracks. For example, in the MD 1 for 74 minutes, the data may be recorded on only the half number of all the tracks. Further, although the data are recorded on all the tracks, it may be not clear to which area of the MD 1 the data are recorded. In these cases, by setting the two executing positions for AGC, i.e. the first executing position (address) P1 on the inner periphery side and second executing position (address) P2 on the outer periphery side, the AGC can be executed at an optimum position on each of the inner periphery side and outer periphery side so that the tracking can be realized stably all the time regardless of the recorded amount of data.

On the other hand, in the case of the recordable type of the MD1, as shown in FIG. 2B, the first executing position R1 and the second executing position R2 are set as follows. The first executing position (address) R1 is a position where the difference between the gain when the AGC is executed on the innermost periphery of a pit area and that when the AGC is executed on the outermost periphery of the pit area PA is 1/2. The second executing position (address) R2 is a position where the difference between the gain when the AGC is executed on the innermost periphery of a groove area GA and that when the AGC is executed on the outermost periphery of the groove area is 1/2. These first and second executing addresses for the recordable type of MD 1 are stored in the memory 6.

In the recordable type of MD, although data are written in the groove area GA by a user, unlike the pre-mastered type, the data are not necessarily recorded from the inner periphery side, but may be recorded only on the outer periphery side. In this case, in an UTOC area on the innermost periphery of the groove area GA, information on which area data have been newly stored is recorded. Therefore, on the side of the system, by reading the information in the UTOC area, it can be known which area (e.g. outer periphery) the data have been newly stored.

Thus, by providing the second executing position (address) R2, which is separate from the pit area PA, as the executing position of AGC for the groove area GA, the tracking can be realized stably regardless of the position where data have been stored in the groove area GA.

Referring to the flowchart of FIG. 3, an explanation will be given of the operation of the optical disk apparatus according to the invention. When an MD 1 is inserted in a disk inlet of the apparatus (step S1), the AGC is executed for reading the TOC area of the MD 1 (step S2). Thus, the disk information stored in the TOC area of the MD 1 are read to detect the kind and recording capacity, etc. of the MD 1 (step S3). Next, the data relative to the executing position of AGC corresponding to the kind of the detected MD 1 is read out from the memory 6 (step S4).

Now, where the MD 1 is of the pre-mastered type, on the basis of the information on the read recording capacity, whether or not the amount of data stored in the MD 1 is more than that at the prescribed position Ps (e.g. address 017Ah) is detected. If less, the first executing position (address) P1 on the inner periphery side is read from the memory 6, whereas if more, the second executing position (address) P2 on the outer periphery side is read from the memory 6. On the other hand, where the MD 1 is of the recordable type, two executing positions of the first executing position (address) in the pit area and the second executing area (address) in the groove area are read.

At each of the executing positions thus read, the AGC for a variable gain amplifier of DSP4 is executed (step S5). Thus, the control operation for AGC is ended.

As understood from the description hitherto made, in accordance with the mode of carrying out the invention, by storing the executing positions previously introduced according to the kinds of the MD 1 in the memory 6, the AGC for the tracking servo can be executed at an optimum position suited to the kind of the MD 1 such as the pre-mastered type and recordable type can be realized. Therefore, a change in the gain control result on the inner periphery can be suppressed and hence trackability for eccentricity of the disk and immunity to flaws can be improved. Such an effect is remarkable in the MD having a smaller diameter than that of CD so that stable tracking can be realized, thereby surely preventing occurrence of dropout of sound.

The above embodiment was explained for the case where the optical disk was applied to the MD. However, it is needless to say that the present invention should not be limited to the MD, but can be applied to the other optical disks such as CD and CD-ROM.

Further, the above embodiment was explained for the case where two AGC executing positions on both sides of an inner periphery and outer periphery are stored in the memory 6. However, a single position where the difference between the gain when the AGC is executed in the innermost periphery of the MD 1 (optical disk) and that when the AGC is executed in the outermost periphery of the MD 1 is 1/2 may be stored as an AGC executing position.

Further, three or more AGC executing positions may be provided. In this case also, the same effect as described above can be obtained.

It is needless to say that the storage unit should not be limited to the ROM externally attached, as described above.

The present invention should not be limited to the above mode for carrying out the invention, but may be realized in various modifications without departing from the spirit of the scope of the invention.

What is claimed is:

1. A method of automatically controlling a gain of a variable gain amplifier in a tracking servo circuit incorporated in an optical disk apparatus for compensating a tracking error detected based on reflected light from an optical disk, comprising the steps of:
   determining a position where the automatic gain control is executed as an optimum position where a gain difference between an inner periphery side and an outer periphery side of the optical disk become small; and
   execute the automatic gain control at the determined optimum position.

2. The automatic gain control method as set forth in claim 1, wherein the optimum position is determined as a position where a gain $A0$ of the variable gain amplifier satisfies the following relationships:

$$A0 = A1 + \frac{A2 - A1}{2}$$

where $A1$ is a gain obtained by executing the automatic gain control at the innermost track of the optical disk; and $A2$ is a gain obtained by executing the automatic gain control at the outermost track of the optical disk.

3. The automatic gain control method as set forth in claim 2, wherein information regarding the optimum position is previously stored in a storage unit; and
   wherein the automatic gain control at the optimum position is executed by reading out the optimum position information from the storage unit.

4. The automatic gain control method as set forth in claim 1, wherein the optimum position includes a first optimum position where is other than the innermost track and a second optimum position located outer than the first optimum position on the optical disk.

5. The automatic gain control method as set forth in claim 4, wherein information regarding the optimum position is previously stored in a storage unit; and
   wherein the automatic gain control at the optimum position is executed by reading out the optimum position information from the storage unit.

6. The automatic gain control method as set forth in claim 5, further comprising the steps of:
   detecting a type of the optical disk; and
   reading out the optimum position information in accordance with the detected type of the optical disk.

7. The automatic gain control method as set forth in claim 6, wherein when the detected type of the optical disk is a non-recordable disk, the first optimum position is determined as a position where a gain $A01$ of the variable gain amplifier satisfies the following relationships:

$$A01 = A1 + \frac{A3 - A1}{2}$$

where $A3$ is a gain obtained by executing the automatic gain control at a predetermined reference position on the optical disk; and
   wherein the second optimum position is determined as a position where a gain $A02$ of the variable gain amplifier satisfies the following relationships:

$$A02 = A3 + \frac{A2 - A3}{2}.$$

8. The automatic gain control method as set forth in claim 6, wherein when the detected type of the optical disk is a recordable disk, the first optimum position is determined as a position where a gain $A01$ of the variable gain amplifier satisfies the following relationships:

$$A01 = A4 + \frac{A5 - A4}{2}$$

where $A4$ is a gain obtained by executing the automatic gain control at the innermost track of a pit area on the optical disk; and $A5$ is a gain obtained by executing the automatic gain control at the outermost track of the pit area; and
   wherein the second optimum position is determined as a position where a gain $A02$ of the variable gain amplifier satisfies the following relationships:

$$A02 = A6 + \frac{A7 - A6}{2}$$

where $A6$ is a gain obtained by executing the automatic gain control at the innermost track of a groove area on the optical disk; and $A7$ is a gain obtained by executing the automatic gain control at the outermost track of the groove area.

9. The automatic gain control method as set forth in claim 1, wherein the optical disk is a minidisk.

* * * * *